(12) United States Patent
Nakamura et al.

(10) Patent No.: US 9,929,391 B2
(45) Date of Patent: Mar. 27, 2018

(54) BUS BAR MODULE WITH INSULATING LAMINATE PORTION

(71) Applicant: TOYODA GOSEI CO., LTD., Kiyosu-shi, Aichi-ken (JP)

(72) Inventors: Yoshiki Nakamura, Kiyosu (JP); Kosuke Kusaba, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 285 days.

(21) Appl. No.: 14/819,973

(22) Filed: Aug. 6, 2015

(65) Prior Publication Data

US 2016/0093864 A1 Mar. 31, 2016

(30) Foreign Application Priority Data

Sep. 29, 2014 (JP) ................................ 2014-199335

(51) Int. Cl.
*H01M 2/28* (2006.01)
*H01M 2/20* (2006.01)
H01M 10/0525 (2010.01)
H01M 2/10 (2006.01)

(52) U.S. Cl.
CPC .......... *H01M 2/206* (2013.01); *H01M 2/1077* (2013.01); *H01M 10/0525* (2013.01); *H01M 2220/20* (2013.01); *Y02E 60/122* (2013.01)

(58) Field of Classification Search
CPC ............... H01M 2/206; H01M 2/1077; H01M 10/0525; H01M 2220/20; Y02E 60/122
See application file for complete search history.

(56) References Cited

U.S. PATENT DOCUMENTS

| 3,692,587 | A | * | 9/1972 | Vetor et al. | ............. | H01M 2/00 429/160 |
| 8,420,249 | B2 | | 4/2013 | Naito et al. | | |
| 8,475,952 | B2 | | 7/2013 | Yasui et al. | | |
| 9,178,192 | B2 | * | 11/2015 | Payne | ..................... | H01M 2/08 |
| 2011/0287299 | A1 | | 11/2011 | Kim | | |

(Continued)

FOREIGN PATENT DOCUMENTS

CN 102263301 A 11/2011
JP 4815026 B2 9/2011

(Continued)

OTHER PUBLICATIONS

Office Action dated Aug. 22, 2017 issued in corresponding JP patent application No. 2014-199335 (and English machine translation).

(Continued)

*Primary Examiner* — Raymond Alejandro
(74) *Attorney, Agent, or Firm* — Posz Law Group, PLC (57) ABSTRACT

A bus bar module is located on one end of each battery of a group of batteries that have terminals at their ends. The bus bar module includes a bus bar, which is made of a conductive metal, and electrically connects the terminals of the respective batteries in the battery group, and an insulating laminate portion that is laminated, at least on an inner surface of the bus bar facing the ends of the batteries and an outer surface, which is opposite to the inner surface of the bus bar. The insulating laminate portion has an insulating material that includes thermoplastic elastomer and/or rubber.

9 Claims, 8 Drawing Sheets

(56) References Cited

U.S. PATENT DOCUMENTS

| | | |
|---|---|---|
| 2012/0129042 A1 | 5/2012 | Kurahashi |
| 2012/0263995 A1 | 10/2012 | Naito et al. |
| 2015/0072211 A1 | 3/2015 | Nakamura et al. |
| 2015/0214518 A1 | 7/2015 | Kano |

FOREIGN PATENT DOCUMENTS

| | | |
|---|---|---|
| JP | 2012-113944 A | 6/2012 |
| JP | 2012-236325 A | 12/2012 |
| JP | 2014-49225 A | 3/2014 |
| WO | 2012/014398 A1 | 2/2012 |
| WO | 2012/073403 A1 | 6/2012 |

OTHER PUBLICATIONS

Office Action dated Sep. 25, 2017 issued in corresponding CN patent application No. 201510548446.2.

\* cited by examiner

Fig. 12
PRIOR ARTS

BUS BAR MODULE WITH INSULATING LAMINATE PORTION

TECHNICAL FIELD

The present invention relates to a bus bar module that connects terminals of batteries.

BACKGROUND ART

Figure 12:
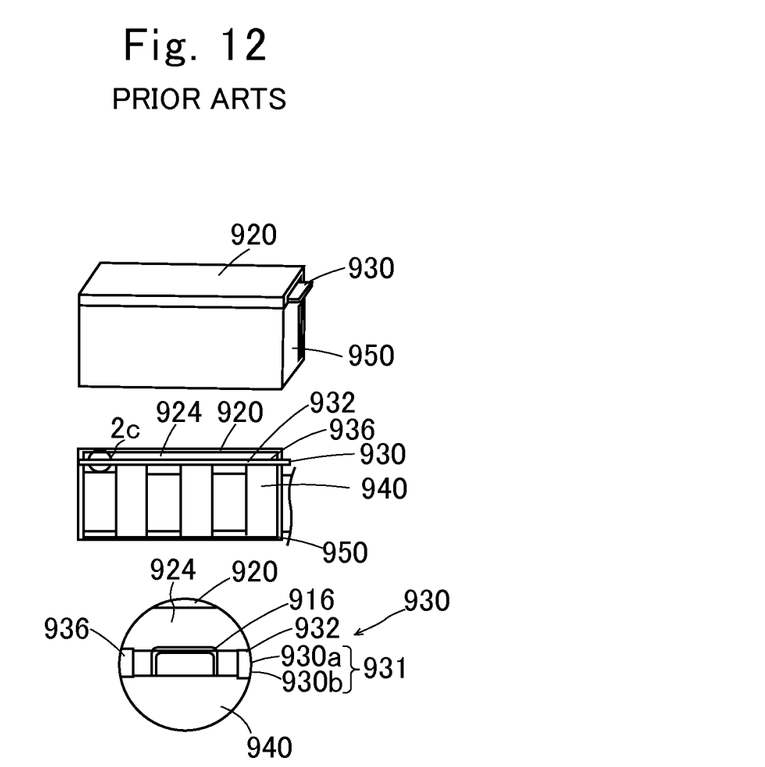

Electric vehicles that run on driving power of electric motors and hybrid vehicles that run on both internal combustion engines and electric motors are each mounted with a battery module, as its power source device, in which a large number of batteries are provided. As the battery module, an example thereof is disclosed in JP 4815026 B. FIG. 12 shows a cross sectional diagram of the battery module disclosed in JP 4815026 B. As shown in FIG. 12, the battery module includes a housing 950 with a lid 920, a plurality of batteries 940 housed inside the housing 950, and a bus bar module 930 disposed at one end side of the plurality of batteries 940. The bus bar module 930 is disposed between a housing chamber 990 for housing the batteries 940 within the housing 950 and a gas discharging chamber 924 in the lid 920 so as to seal the housing chamber 990. The plurality of batteries 940 is connected in parallel by the bus bar module 930 with their positive electrode caps 916 oriented toward the one end side where the bus bar module 930 is disposed. The bus bar module 930 includes a laminated plate 931 in which a heat resistant member 930a and an elastic member 930b are laminated, and a conductive connector 932 formed on a surface of the laminated plate 931. The positive electrode caps 916 are inserted in through holes 936 formed in the laminated plate 931. The positive electrode caps 916 are connected to the connectors 932.

In a lithium ion battery, sudden heat generation may take place by overcharging, over-discharging, short circuiting, and the like. In this case, an internal pressure inside the batteries may rise due to air expansion inside of the battery or generation of volatile gas from electrolytic solution, and there is a fear of resulting in a breakage. Due to this, the lithium ion battery is provided with a valve for releasing the gas upon when the internal pressure rises. In a case where the lithium ion battery has a cylindrical shape, the valve is provided at an end of this cylindrical-shaped battery in an axial direction. In an in-vehicle battery module, the housing chamber 990 is communicated with a vehicle compartment, and the gas discharging chamber 924 is communicated with outside of the vehicle. While the gas generated from the battery is caused to flow into the gas discharging chamber 924, the interval between the end of the battery 940 and the bus bar module 930 is sealed so that no gas leaks out to a driver's seat, and the housing chamber 990 is isolated from the gas discharging chamber 924.

However, the bus bar module 930 described in JP 4815026 B has a two-layer structure in which the heat resistant member 930a and the elastic member 930b are laminated, and the structure is thereby complicated.

Thus, the inventor has conducted keen investigation to develop a bus bar module with a simple configuration. During the development of the bus bar module, it was considered to insert molding a bus bar formed of a metal thin plate with a polymeric material. However, a thermal expansion coefficient of the metal bus bar is smaller than a thermal expansion coefficient of the polymeric material. Due to this, the polymeric material may shrink after the molding and an entirety of the bus bar module may warp, and the interval between the end of the battery and the bus bar module may not be sealed surely. In such a case, if the battery generates gas due to overcharging, over-discharging, internal short circuiting, or external short circuiting, the gas is discharged from the end of the battery 940 into the gas discharging chamber 924. If there is a gap between the end of the battery 940 and the bus bar module 930, the gas may leak out to the housing chamber 990 and the external periphery of the housing 950 from the gas discharging chamber 924 through the gap, and the gas may be directed into the vehicle compartment.

Further, there also is a desire to be able to absorb assembly discrepancy of the battery and the like by the bus bar module 930 by preventing the warping of the bus bar module.

To solve this problem, JP 2012-236325 A proposed fitting a stainless sheet in which a slit is formed into a cavity of a molding die and pouring molten resin therein, so that the shrinking upon the cooling of the molten resin can be alleviated by the slit.

However, the rigidity of the stainless sheet lowers due to the slit.

CITATION LIST

Patent Literature

Patent Literature 1: JP 4815026 B
Patent Literature 2: JP 2012-236325 A

SUMMARY OF INVENTION

Technical Problem

The present invention has been made in view of the above circumstance, and aims to provide a bus bar module that can prevent warping of a module caused by mold shrinkage with a simple configuration.

(1) A bus bar module of the present invention is disposed on one end side of each battery in a battery group consisting of a plurality of batteries having terminals at their ends in an axial direction, the bus bar module including: a bus bar made of a conductive metal and electrically connecting the terminals of the respective batteries in the battery group; and an insulating laminate portion that is laminated, at least on an inner surface of the bus bar, among the inner surface facing the ends of the batteries and an outer surface on an opposite side of the inner surface of the bus bar, wherein the insulating laminate portion having an insulating material comprising thermoplastic elastomer and/or rubber.

According to the above configuration, the insulating laminate portion including the insulating material comprising thermoplastic elastomer and/or rubber is laminated at least on the inner surface, among the inner surface facing the ends of the batteries in the bus bar and the outer surface.

Generally, resin has a larger thermal expansion difference than metal; thus, when a metal component is put in a mold and resin is insert molded thereon, the post-molding shrinking amount of the resin is larger than that of metal, and distortion is generated in the resin. However, the insulating material comprising thermoplastic elastomer and/or rubber has a relatively low flexural modulus, and has a large elongation at yield. Further, the insulating material comprising thermoplastic elastomer and/or rubber has a large ductility. An insulating laminate portion that includes the insulating material comprising thermoplastic elastomer and/or rubber warps together with the bus bar, following the respective ends of the batteries. Due to this, the insulating laminate portion that includes the insulating material comprising thermoplastic elastomer and/or rubber suppresses its shrinking amount by following the bus bar, of which shrinking rate is small. The warping of the bus bar module is prevented, and an interval between the bus bar module and the ends of the batteries can surely be sealed.

Furthermore, since the insulating laminate portion of the bus bar module includes the insulating material comprising thermoplastic elastomer and/or rubber, an assembly discrepancy of the batteries and a holder for holding the batteries can thereby be absorbed.

(2) It is preferable for the bus bar module that a plurality of the bus bars is arranged along one direction of the bus bar module, and an insulative intervening portion having an insulating material is intervened between each of the bus bars.

The bus bar is divided into a plurality along one direction of the bus bar module, and the insulative intervening portion is caused to be intervened between the divided bus bars. Due to this, the bus bars become short, and stress caused by a difference in the shrinking amount of the bus bars and the shrinking amount of the insulating laminate portion after the molding becomes small. Due to this, a deformation of the bus bar module such as warping can effectively be prevented. The bus bar module warps flexibly by following the respective ends of the batteries, and surely makes contact with the respective ends of the batteries. Due to this, the interval between the ends of the batteries and the bus bar module can surely be sealed.

(3) It is preferable that the insulating laminate portion is provided with at least one stress splitting portion. By forming the stress splitting portion in the insulating laminate portion, stress generated in the insulating laminate portion is split by the stress splitting portion. Due to this, deformation of the entirety of the module can more effectively be suppressed.

(4) It is preferable that a plurality of the stress splitting portions is uniformly interspersed in the insulating laminate portion. The portion where the stress is generated is split over the entirety of the insulating laminate portion. Due to this, the deformation of the entirety of the bus bar module such as warping can effectively be prevented.

(5) It is preferable that the bus bar includes connection holes for connecting with the terminals of the batteries, and the stress splitting portion is an opening formed at a position whose location in a planar direction matches that of the connection hole. The stress splitting portion is an opening formed in the insulating laminate portion. This opening is formed over the connection hole that connects a terminal of a battery to the bus bar. Due to this, the stress splitting portion can effectively be disposed.

(6) It is preferable that, when the bus bar module is projected in a perpendicular direction that intersects perpendicularly with a longitudinal direction of the bus bar module, the plurality of stress splitting portions is present while being overlapped with each other continuously from one end to the other end in the perpendicular direction of the bus bar module.

In this case, over the entirety from one end to the other end in the perpendicular direction of the bus bar module, the stress generated after the molding is split somewhere in the longitudinal direction of the bus bar module. The stress working in the longitudinal direction of the bus bar module is split at the stress splitting portion, so the deformation of the bus bar module can effectively be prevented.

(7) It is preferable that a plurality of the stress splitting portions is arranged along a longitudinal direction of the bus bar module. In this case, two or more stress splitting portions are arranged along the longitudinal direction of the bus bar module. The stress generated in the bus bar module can be split at plural portions in the longitudinal direction.

(8) It is preferable that the insulating laminate portion covers from the inner surface to the peripheral portion of the outer surface of the bus bar, encompassing a side surface of the bus bar.

Since the insulating laminate portion covers the bus bar from the inner surface to the outer surface of the bus bar while encompassing the side surface thereof, the insulating laminate portion is engaged in a vicinity of the side surface of the inner surface of the bus bar. Since a post-molding shrinking amount of an insulating material comprising thermoplastic elastomer and/or rubber configuring the insulating laminate portion is larger than that of metal configuring the bus bar, the insulating laminate portion tightly fits onto the bus bar without any gap by following the bus bar, in a somewhat stretched state. Due to this, the insulating laminate portion is firmly fixed to the bus bar.

(9) It is preferable that the bus bar includes a projecting portion, and a whole circumference of the projecting portion is covered by an elongated portion elongated from the insulating laminate portion.

The insulating laminate portion is tightly fitted onto the bus bar without any gap in the state of being somewhat stretched by following the bus bar. Due to this, the insulating laminate portion is surely fixed to the bus bar. Further, with the projecting portion being projecting out from a housing that houses the batteries, gas generated from the batteries can surely be prevented from leaking out to outside from between the projecting portion and the insulating laminate portion covering it.

(10) It is preferable that a flexural modulus of the thermoplastic elastomer and/or rubber is 20 MPa to 1300 MPa. Since the insulating laminate portion is formed of the material having the above flexural modulus, it is stretched further by larger amount of mold shrinkage, and is surely fixed onto the bus bar.

(11) It is preferable that an elongation at yield of the thermoplastic elastomer and/or rubber is 15% or more. The insulating laminate portion can stretch by following the bus bar after the molding. Due to this, the insulating laminate portion is surely fixed to the bus bar.

Due to having the above configurations, the present invention can provide a bus bar module that can prevent the deformation of the entirety of the module caused by mold shrinkage by using a simple configuration.

BRIEF DESCRIPTION OF DRAWINGS

An upper part of FIG. 12 is a perspective diagram of a battery module of a conventional example, a middle part of FIG. 12 is a cross sectional diagram of the battery module of the conventional example, and a lower part of FIG. 12 is an enlarged cross sectional diagram of a 2c portion of the middle part of FIG. 12.

DESCRIPTION OF EMBODIMENTS

A bus bar module of an embodiment of the present invention is disposed on one end side of each battery in a battery group consisting of a plurality of batteries having terminals at their ends in an axial direction. The plurality of batteries configures the battery group by being arranged in parallel to each other in the axial direction. The bus bar module preferably makes contact with ends of the respective batteries configuring the battery group. Due to this, an interval between the ends of the batteries and the bus bar module is sealed.

The bus bar module includes a bus bar and an insulating laminate portion. The bus bar electrically connects terminals of the respective batteries in the battery group. The bus bar is formed of conductive metal. As the conductive metal used in the bus bar, for example, copper, aluminum, and iron may be exemplified. The bus bar is for example a thin plate, and its thickness is preferably 0.15 mm or more and 3 mm or less. Due to this, it can surely make contact with the ends of the batteries by flexibly following the ends of the batteries, and the interval between the ends of the batteries and the bus bar module can surely be sealed.

Each battery has a pair of ends in the axial direction, and the bus bar module may be provided on only one end side, or may be provided on both end sides. The battery module including the battery group and the bus bar module is housed in a housing with a cover, and a space for discharging gas that may be generated from ends of the batteries is preferably formed inside the housing. In this case, the bus bar module is preferably provided on the end side near the space for discharging. In this case, the interval between the ends of the batteries and the bus bar module is surely sealed. Due to this, the gas that may be generated upon short circuiting, overcharging and the like from the ends of the batteries can be prevented from leaking out to peripheral outer portion of the housing.

The bus bar for example includes connection holes for connecting with the terminals of the batteries. The connection hole is formed for each terminal of the batteries. A projection piece protrudes from each connection hole, and the terminal is electrically connected to this projection piece by welding and the like.

The bus bar comprises an inner surface facing the ends of the batteries, and an outer surface on an opposite side of the inner surface. The insulating laminate portion is laminated at least on the inner surface, among the inner surface and the outer surface of the bus bar. The inner surface of the bus bar faces the ends of the plurality of batteries configuring the battery group. In order to prevent short circuiting among the batteries in the battery group, the inner surface of the bus bar needs to be covered by the insulating laminate portion so as to insulate the respective batteries from each other.

The material configuring the insulating laminate portion includes an insulating material comprising thermoplastic elastomer and/or rubber. The thermoplastic elastomer and/or rubber is of a texture that stretches relatively easily. Due to this, by forming the insulating laminate portion covering the bus bar by the insulating material comprising thermoplastic elastomer and/or rubber, a difference in the post-molding shrinking amounts caused by a difference in thermal expansion of metal and resin is made smaller.

The thickness of the insulating laminate portion may be 0.05 mm or more and 2 mm or less. In this case, the insulating laminate portion can warp by following the deformation of the bus bar, while maintaining its insulating performance.

A flexural modulus of the thermoplastic elastomer and/or rubber configuring the insulating laminate portion is preferably 20 to 1300 MPa, more preferably 20 to 500 MPa, and most preferably 20 to 300 MPa. The flexural modulus of the insulating material comprising thermoplastic elastomer and/or rubber configuring the insulating laminate portion is measured by conforming to ASTM D790. In the present invention, in a case where the insulating material comprising thermoplastic elastomer and/or rubber configuring the insulating laminate portion has the aforementioned flexural modulus, the insulating laminate portion becomes easily warped. Further, the bus bar is a thin metal plate, and easily warps. Due to this, the insulating laminate portion flexibly warps together with the bus bar following the ends of the battery group, and the interval between the ends of the batteries and the bus bar module can surely be sealed. In a case where the flexural modulus of the insulating material comprising thermoplastic elastomer and/or rubber is too small, the insulating laminate portion warps; however, there is a fear that an assembly thereof and the like may become difficult. In a case where the flexural modulus of the insulating material comprising thermoplastic elastomer and/or rubber is too large, it becomes more difficult to warp, and there is a fear that the sealing performance is reduced.

An elongation of yield of the thermoplastic elastomer and/or rubber configuring the insulating laminate portion is preferably 15% or more, more preferably 20% or more, and most preferably 30% or more. The elongation of yield is measured conforming to JIS K7161 and the like. Generally, the insulating material comprising thermoplastic elastomer and/or rubber configuring the insulating laminate portion has a larger thermal expansion coefficient and a larger post-molding shrinking amount than materials such as metal configuring the bus bar. In the present invention, in a case where the thermoplastic elastomer and/or rubber has the aforementioned elongation at yield, ductility of the insulating laminate portion becomes higher. Due to this, the shrinking amount of the insulating laminate portion can be made small according to the shrinking amount of the bus bar, so that the deformation of the bus bar module as a whole can be suppressed. In a case where the elongation at yield of the thermoplastic elastomer and/or rubber is too small, there is a fear that the insulating laminate portion may shrink upon molding and break.

As the thermoplastic elastomer configuring the insulating laminate portion, for example, those listed in JIS K6418 may be used. Specifically, amide-based thermoplastic elastomer (TPA), ester-based thermoplastic elastomer (TPC), olefin-based thermoplastic elastomer (TPO), styrene-based thermoplastic elastomer (TPS), urethane-based thermoplastic elastomer (TPU), thermoplastic rubber-crosslinking body (TPV), and other thermoplastic elastomer (TPZ) may be exemplified. Among these, TPC, TPO, and TPV are preferable, and TPC is more preferable.

Further, as the rubber configuring the insulating laminate portion, for example, composite rubber such as vulcanized rubber, EPDM (ethylene-propylene-diene co-polymeric rubber), silicone rubber, FKM (fluorine rubber), ACM (acrylic rubber) and the like, and natural rubber can be exemplified.

The insulating laminate portion covers at least the inner surface among the inner surface of the bus bar facing the battery group, and the outer surface thereof on its opposite side. The insulating laminate portion may cover only the inner surface of the bus bar, or may cover both the inner surface and the outer surface thereof. Further, the insulating laminate portion may cover both the inner surface and the side surface of the bus bar, and moreover, it preferably covers a peripheral portion of the outer surface from the inner surface, encompassing the side surface in a continuous manner. Desirably, the insulating laminate portion covers almost the entirety of the inner surface of the bus bar, and continuously covers the entirety of the outer surface by encompassing the side surface of the bus bar. Generally, the insulating material comprising thermoplastic elastomer and/or rubber configuring the insulating laminate portion has a larger thermal expansion coefficient and a larger post-molding shrinking amount than the metal configuring the bus bar. The insulating laminate portion is tightly fitted onto the bus bar without any gap in the state of being somewhat stretched by following the bus bar. The insulating laminate portion is engaged with the side surface of the bus bar, and moreover with the peripheral portion of the outer surface thereof, by covering not only the inner surface of the bus bar but also the side surface of the bus bar, and moreover at least the peripheral portion of the outer surface thereof. Due to this, the insulating laminate portion adheres more surely to the bus bar without any gap. Peeling of the insulating laminate portion from the bus bar accompanying the shrinking of the insulating laminate portion after the molding can surely be prevented, and the insulating laminate portion can be fixed firmly to the bus bar.

Further, a through hole may be provided in the bus bar, and allow a part of the insulating laminate portion to intrude from an outer surface-side peripheral portion of the through hole onto the inner surface. Due to this, the insulating laminate portion is caused to further become resistant against the abrasion from the bus bar by an anchoring effect of the insulating laminate portion intruding into the through hole.

The bus bar may include a projecting portion. The projecting portion may for example be an electricity output portion for electrically connecting the bus bar to another member, or may be a fixing portion for fixing the bus bar onto another member. This projecting portion may be covered by an elongated portion extended from the insulating laminate portion. Moreover, a whole circumference of the projecting portion is preferably covered by the elongated portion. In this case, the insulating laminate portion is engaged with the bus bar by the elongated portion, so that the insulating laminate portion can surely be prevented from peeling from the bus bar accompanying the post-molding shrinking of the insulating laminate portion. In a case where the projecting portion projects out from the housing, the bus bar and the insulating laminate portion are tightly fitted without any gap by the insulating laminate portion slightly stretching by following the bus bars after the molding. Due to this, the gas generated from the batteries can surely be prevented from leaking out to the outside of the housing from the interval between the bus bar and the insulating laminate portion.

It is preferable that a plurality of the bus bars is arranged along one direction of the bus bar module, and an insulative intervening portion having an insulating material is intervened between each of the bus bars. The one direction of the bus bar module may be any direction included in a planar direction of the bus bar module, and may be either an extending direction of a long portion of the bus bar module or an extending direction of a short portion thereof.

Preferably, a plurality of insulative intervening portions is arranged in the extending direction of the long portion of the bus bar module. A deformation amount of the bus bar module in the longitudinal direction is large as compared to deformation amounts of the bus bar module in other directions. Thus, the bus bar is divided into a plurality along the longitudinal direction of the bus bar module, and an insulative intervening portion is intervened respectively between the divided bus bars. Due to this, the bus bars become short, and stress generated in the insulating laminate portion caused by the difference in the shrinking amount of the bus bars and the shrinking amount of the insulating laminate portion after the molding becomes small. Due to this, the deformation of the bus bar module such as warping can more effectively be prevented and the bus bar module can more surely contact the ends of the batteries, so that the battery group can be retained stably. Further, since intervals between respective bus bars are insulated by the insulative intervening portions, a plurality of sets can be formed among the battery group by configuring a plurality of batteries connected to each bus bar as one set. A connection structure of the batteries within each set may be parallel or serial. Further, a connection structure between sets may be serial or parallel. By forming the plurality of sets within the battery group, adjustments of current amounts and voltage that can be outputted from the battery group can be performed easily by changing the connection structure within each set or between the sets.

The insulative intervening portions are preferably formed in the bus bar module continuously over an entirety from one end to the other end in a perpendicular direction that is perpendicular to the longitudinal direction. Due to this, the adjacent bus bars can surely be insulated from each other by the insulative intervening portions.

The insulative intervening portions are formed preferably at the same time as the formation of the insulating laminate portion. The insulative intervening portions are not specifically limited so long as they are configured of an insulating material; however, for example, it is preferably formed of the thermoplastic elastomer and/or rubber. Moreover, the insulative intervening portions are preferably formed of the same material as the insulating laminate portion. Due to this, electric insulation between the bus bars (creeping distance) can effectively be secured.

A width of the insulative intervening portions intervened between the bus bars, that is, a distance between adjacent bus bars may change depending on the voltage applied to the bus bars, insulating resistance of the material of the insulative intervening portions, and the like. The width of the insulative intervening portions intervened between the bus bars, that is, the distance between adjacent bus bars is preferably 3 mm or more in the creeping distance (minimum distance between bus bars), for example, and more preferably 6 mm or more. The adjacent bus bars can surely be insulated from each other, and the battery group can be stored in a compact manner. In a case where the width of the insulative intervening portions is too narrow, there is a fear that the adjacent bus bars cannot surely be insulated. In a case where the width of the insulative intervening portions is too wide, the housing space of the battery group becomes larger, and there is a fear that the compact space cannot be implemented.

It is preferable that at least one stress splitting portion is formed in the insulating laminate portion. Moreover, it is preferable that at least one stress splitting portion is formed in the insulating laminate portion along the longitudinal direction of the bus bar module. The stress splitting portion refers to a portion having a structure by which the stress generated in the insulating laminate portion can be split. The stress splitting portion is for example an opening formed in the insulating laminate portion. By forming at least one such stress splitting portion in the longitudinal direction of the insulating laminate portion, the stress generated in the longitudinal direction can be dispersed into small magnitudes, and the abrasion of the insulating laminate portion can further be prevented.

It is preferable that a plurality of the stress splitting portions is uniformly interspersed in the insulating laminate portion. Further, the stress splitting portions may be interspersed over an entirety from its one end to the other end in the longitudinal direction of the insulating laminate portion. The stress splitting portions may be interspersed over the entirety from its one end to the other end in a direction other than the longitudinal direction of the insulating laminate portion. Further, it is preferable that the stress splitting portions are uniformly interspersed over the entirety of the insulating laminate portion. Due to this, the stress generated in the insulating laminate portion can be dispersed into small magnitudes, and the abrasion of the insulating laminate portion can further be prevented.

It is preferable that, when the bus bar module is projected in the perpendicular direction that intersects perpendicularly with the longitudinal direction of the bus bar module, the plurality of stress splitting portions is present while being overlapped with each other continuously from one end to the other end of the bus bar module in the perpendicular direction of the bus bar. In this case, the stress splitting portions are present at some portions of the bus bar module in the longitudinal direction, over the entirety from its one end to the other end in the perpendicular direction of the bus bar module. Over the entirety from the one end to the other end in the perpendicular direction of the bus bar module, stress generated due to the molding shrinkage is split somewhere in the longitudinal direction of the bus bar module. The deformation of the entirety of the bus bar module can be prevented.

Among the plurality of stress splitting portions, at least two of them are preferably overlapped each other in the longitudinal direction of the bus bar module. The stress is split at two or more portions in the longitudinal direction of the insulating laminate portion. Due to this, the stress generated in the insulating laminate portion after the molding can be dispersed into smaller magnitudes, and the insulating laminate portion can more surely be fixed to the bus bars.

The bus bars include connection holes for connecting the terminals of the batteries. Each stress splitting portion can preferably be formed at a position that has a common position in the planar direction with the connection hole. A "position that has a common position in the planar direction with the connection hole" means "a position that is at the same position as the connection hole in the planar direction, or a position where the whole connection hole or a part thereof is overlapped. In this case, each stress splitting portion is preferably an opening that forms a concentric circle with the connection hole. This opening functions also as a gas hole for allowing the gas generated from the batteries to flow out to an upper chamber of the bus bar module. The openings as the stress splitting portions are preferably of the same size as the connection holes of the bus bars, or somewhat larger. By forming the openings as the stress splitting portions larger than the connection holes, a work of removing burrs that are generated on opening peripheries upon the molding can easily be removed.

To manufacture the bus bar module, for example, the bus bars may be disposed within a molding die and the insulating material comprising thermoplastic elastomer and/or rubber may be insert molded. The insert molding may similarly be performed upon when rubber is used as the insulating laminate portion.

The bus bar module of the present invention is used to retain the respective battery groups and output electricity from the terminals of the batteries. The bus bar module of the present invention is for example used as a component of a battery module in a driving power source of an electric vehicle, or a hybrid vehicle.

EMBODIMENTS

First Embodiment

Figure 1:
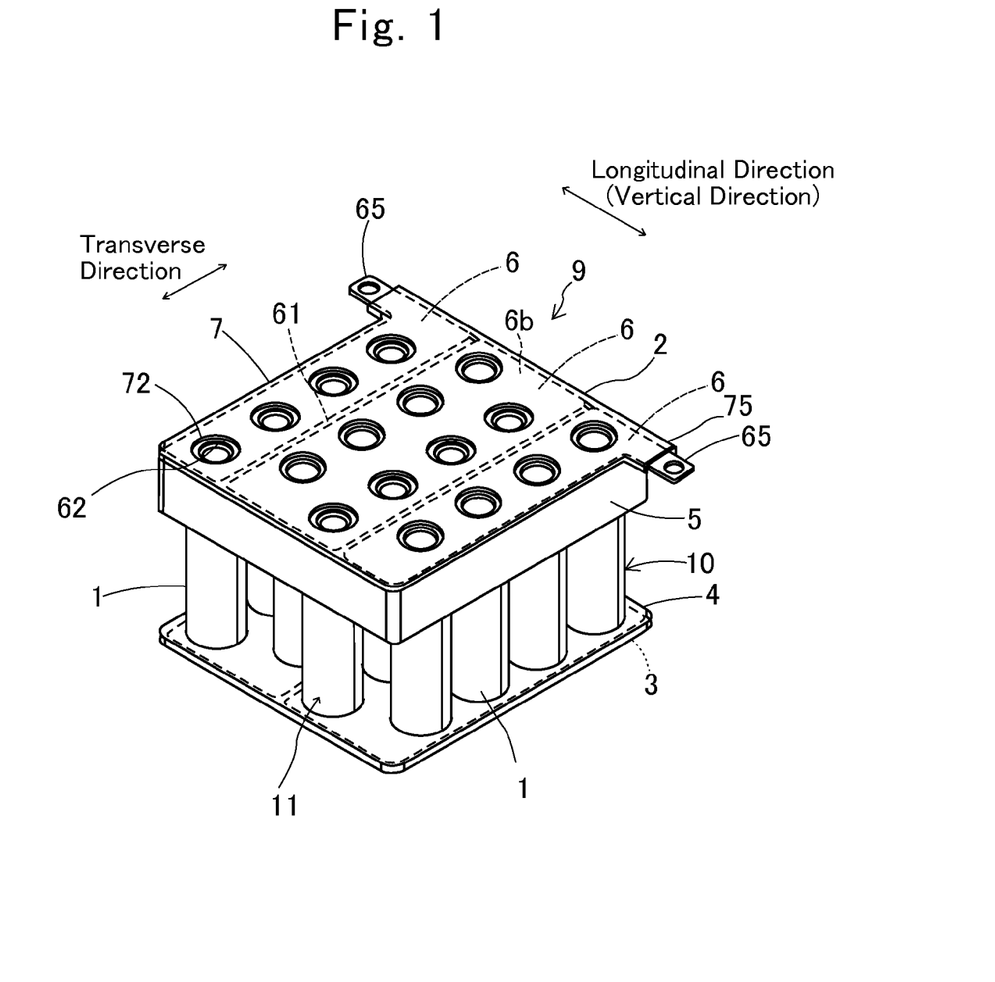
FIG. 1 is a perspective diagram of a battery module of a first embodiment.
Figure 2:
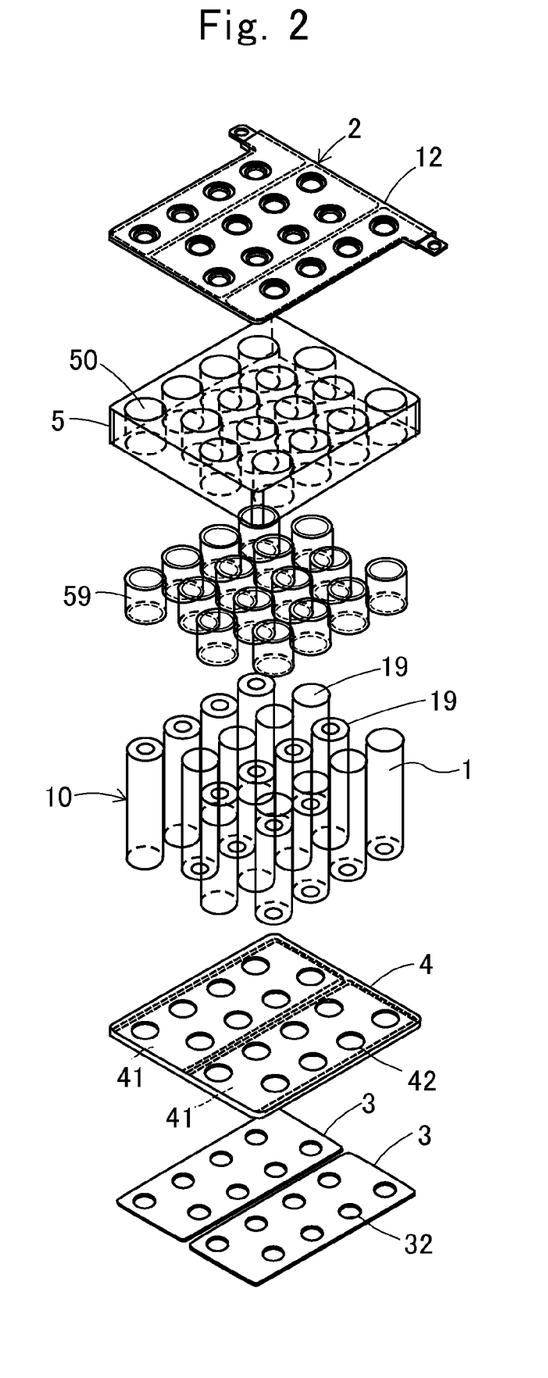
FIG. 2 is a disassembled perspective diagram of the battery module of the first embodiment.

A bus bar module 2 of the present first embodiment is one of constituent components of a battery module 9 as shown in FIG. 1 and FIG. 2. The battery module 9 is configured of a battery group 10, a holder 5, a bus bar module 2, a separator 4, and lower bus bars 3.

As shown in FIG. 1 and FIG. 2, the battery group 10 is configured by a plurality of batteries 1 being arranged in parallel to each other with their longitudinal directions being aligned. In the first embodiment, the battery group 10 is configured of 16 pieces of batteries 1. The respective batteries 1 in the battery group 10 are cylindrical cells having substantially the same shape, and each have a terminal 19 (positive terminal and negative terminal) at both ends in an axial direction.

The holder 5 is made of metal, and includes 16 pieces of battery retaining portions 50. Each of the battery retaining portions 50 has a through-hole shape, and an inner diameter of each battery retaining portion 50 is somewhat larger than an outer diameter of the respective batteries 1. Each battery retaining portion 50 has a corresponding battery 1 inserted therein. Adhesives 59 are interposed between inner circumferential surfaces of the battery retaining portions 50 and outer circumferential surfaces of the batteries 1, and fix the batteries 1 to the battery retaining portions 50. The adhesives 59 are made of epoxy resin.

In the battery module 9, the bus bar module 2 is disposed at one end side in the axial direction of the battery group 10, and the lower bus bars 3 are disposed via the separator 4 at the other end side in the axial direction of the battery group 10. In FIG. 1 and FIG. 2, each battery 1 configuring the battery group 10 is disposed such that its axial direction becomes parallel to an up and down direction. In the present first embodiment, the respective batteries 1 are serially connected by the bus bar module 2 and the lower bus bars 3 in units of 4 batteries per one set.

Figure 3:
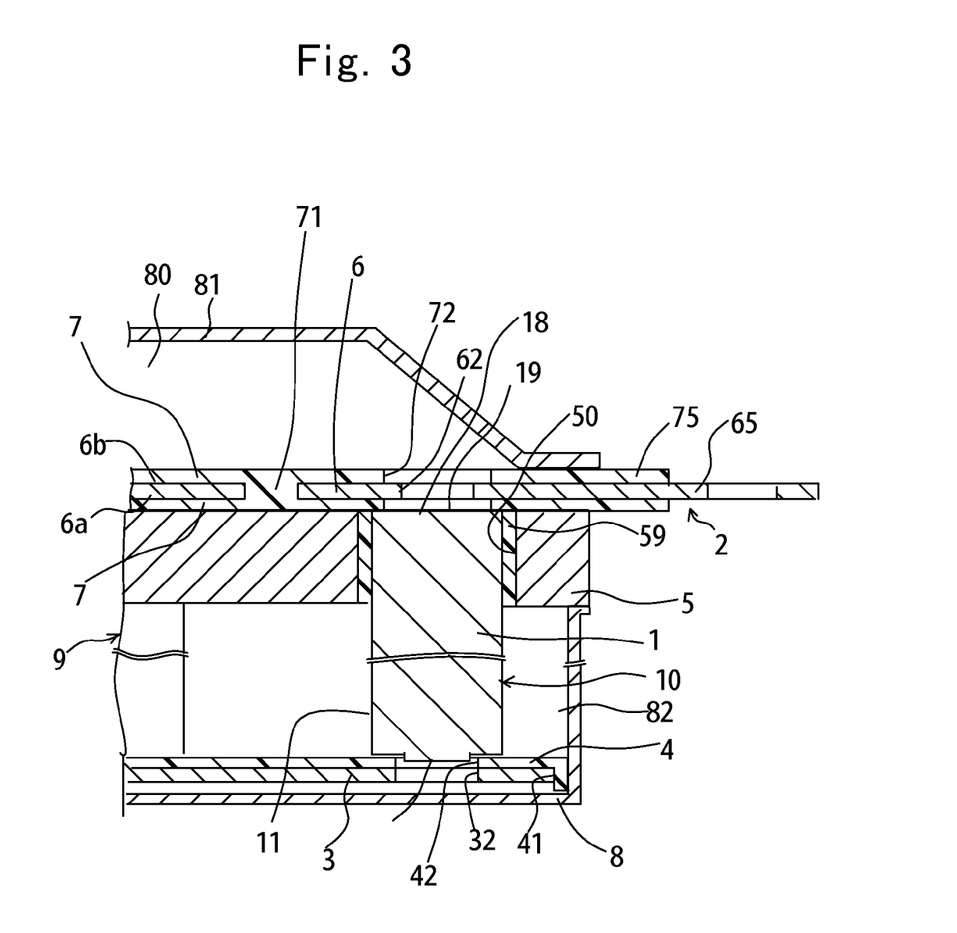
FIG. 3 is a cross sectional explanatory diagram of the battery module of the first embodiment housed in a housing.

As shown in FIG. 3, the battery module 9 is housed in a housing 8. An upper part of the battery module 9 is covered by a cover 81 with a space 80 in between. The bus bar module 2 is disposed between this space 80 and the holder 5 for retaining the battery group 10.

Figure 4:
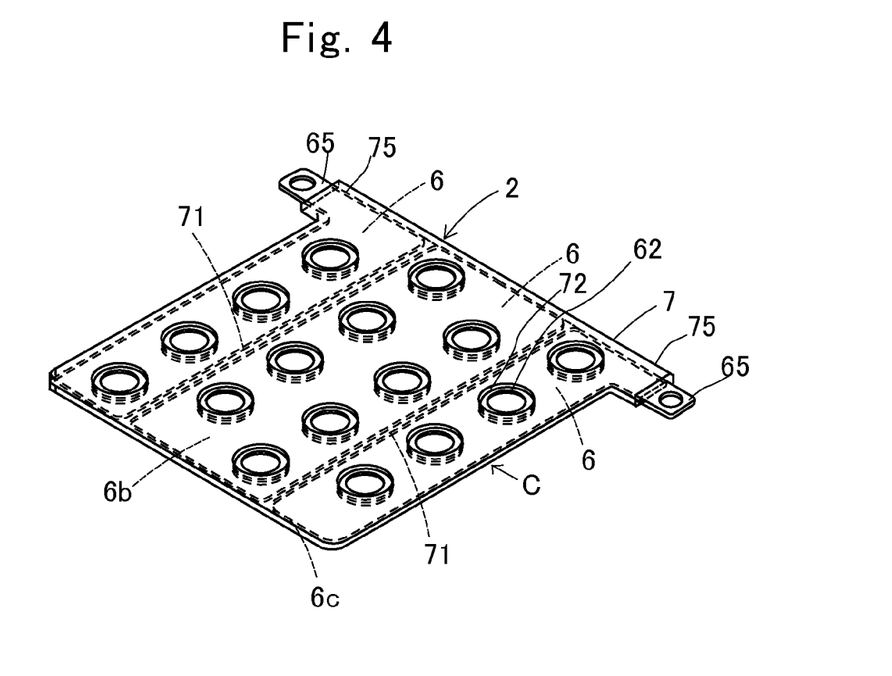
FIG. 4 is a perspective diagram of a bus bar module of the first embodiment as seen from above.

As shown in FIG. 4, the bus bar module 2 includes bus bars 6, an insulating laminate portion 7, insulative intervening portions 71, openings 72 as stress splitting portions, and elongated portions 75.

The bus bars 6 electrically connect terminals 19 formed at ends 18 of the respective batteries 1 in the battery group 10. The bus bars 6 are thin plates made of copper, with a thickness of 0.4 mm.

Figure 6:
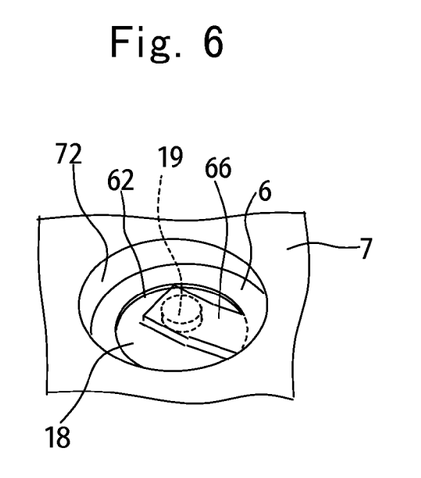
FIG. 6 is a partially enlarged diagram of the battery module of the first embodiment, showing a connection of a terminal of a battery and a bus bar.

The bus bars 6 include connection holes 62 for connecting with the terminals 19 of the batteries 1. As shown in FIG. 6, in the first embodiment, a connection hole 62 is formed for each terminal 19 of the corresponding battery 1. A tab 66 protrudes from each connection hole 62, and the terminal 19 is electrically connected to this tab 66 by welding and the like. Notably, other than the above tab 66, a structure for electrically connecting the bus bar 6 and the terminal 19 of the battery 1 includes known structures such as wire bonding, brazing, and the like.

Figure 5:
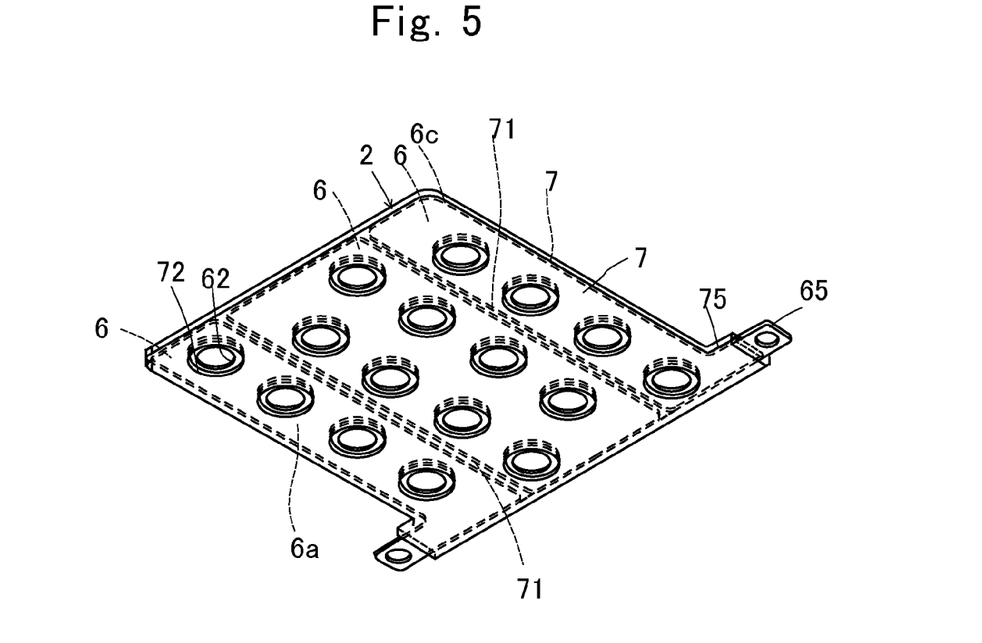
FIG. 5 is a perspective diagram of the bus bar module of the first embodiment as seen from below.

As shown in FIG. 4 and FIG. 5, the insulating laminate portion 7 is laminated on both inner surfaces 6a facing the ends 18 of the batteries 1 and outer surfaces 6b on an opposite side thereof of the bus bars 6. In order to prevent short circuiting between the batteries 1 in the battery group 10, the inner surfaces 6a of the bus bars 6 are covered by the insulating laminate portion 7 so as to insulate the respective batteries 1 from one another.

A material configuring the insulating laminate portion 7 is an insulating material including TPC (product name: Hytrel, made by Du Pont-Toray Co., Ltd.), which is one type of thermoplastic elastomer. A mass ratio of the TPC is 82 mass % when assuming that an entirety of the insulating laminate portion 7 is 100 mass %. A flexural modulus of the TPC configuring the insulating laminate portion 7 is 150 MPa. Elongation at yield of the TPC configuring the insulating laminate portion 7 is 30%.

The insulating laminate portion 7 covers substantially entireties of the outer surfaces 6b of the bus bars 6 in a continuing manner encompassing the inner surfaces 6a and side surface 6c thereof. A thermal expansion coefficient of the TPC configuring the insulating laminate portion 7 is $21 \times 10^{-5}$ mm/mm/K, and a thermal expansion coefficient of the copper configuring the bus bars 6 is $1.7 \times 10^{-5}$ mm/mm/K. The TPC has a larger thermal expansion coefficient than the copper, and also has a larger post-molding shrinking amount. The insulating laminate portion 7 is tightly fitted onto the bus bars 6 without any gap in a state of being somewhat stretched by following the bus bars 6. The insulating laminate portion 7 is engaged with the side surfaces 6c of the bus bars 6, and moreover the outer surfaces 6b thereof, by covering not only the inner surfaces 6a of the bus bars 6 but also the side surfaces 6c of the bus bars 6, and moreover the outer surfaces 6b thereof. Due to this, the insulating laminate portion 7 adheres more firmly to the bus bars 6 without any gap. Abrasion of the insulating laminate portion 7 from the bus bars 6 accompanying the shrinking of the insulating laminate portion 7 after the molding can surely be prevented, and the insulating laminate portion 7 can be fixed firmly to the bus bars 6.

The bus bars 6 include projecting portions 65. The projecting portions 65 are electricity output portions for electrically connecting the bus bars 6 to another member. The projecting portions 65 are covered by the elongated portions 75 extending from the insulating laminate portion 7, and a whole circumference of each projecting portion 65 is covered by the elongated portion 75. Due to this, the insulating laminate portion 7 is engaged with the bus bars 6 by the elongated portions 75, so that the abrasion of the insulating laminate portion 7 from the bus bars 6 by a post-molding shrinking difference can surely be prevented. The projecting portions 65 protrude from the housing 8 for storing the batteries 1; however, gas generated from the batteries 1 can surely be prevented from leaking out to outside from the interval between the projecting portions 65 and the insulating laminate portion 7 covering them.

Distal ends of the projecting portions 65 are protruded from the interval between the housing 8 and the cover 81. The bus bars 6 and the insulating laminate portion 7 are tightly fitted without any gap by the insulating laminate portion 7 slightly stretching by following the bus bars 6 after the molding.

The bus bar module 2 is a rectangular thin plate with a vertical width (longitudinal direction) of 108 mm, a transverse width of 88 mm, and a thickness of 2.4 mm. The vertical direction of the bus bar module 2 is a direction longer than its transverse direction. The vertical direction of the bus bar module 2 will be termed the longitudinal direction of the bus bar module 2. A plurality of bus bars 6 is arranged along the longitudinal direction of the bus bar module 2. The insulative intervening portion 71 made of the TPC is intervened between the respective bus bars 6. A deformation amount of the bus bar module 2 in the longitudinal direction is large as compared to deformation amounts of the bus bar module 2 in other directions. Thus, the bus bars 6 are divided into a plurality along the longitudinal direction of the bus bar module 2, and the insulative intervening portions 71 are caused to be intervened between the divided bus bars 6. Due to this, a length of each bus bar 6 becomes short, and stress generated in the insulating laminate portion 7 caused by a difference in the shrinking amount of the bus bars 6 and the shrinking amount of the insulating laminate portion 7 after the molding becomes small. Due to this, the deformation of the bus bar module 2 such as warping can more effectively be prevented and contacting with the ends 18 of the batteries 1 is surely performed, so that the battery group 10 can be retained in the holder 5. Further, since the respective bus bars 6 are insulated from each other, the plurality of batteries 1 connected to each bus bar 6 can be regarded as one set, so as to form a plurality of battery packs 11 within the battery group 10. In the present first embodiment, one set of battery pack 11 is configured of four batteries 1 aligned in one line. Connections of the batteries 1 within each battery pack 11 are parallel connections. Further, adjacent battery packs 11 are connected serially by their upper side bus bar 6 and the lower bus bar 3.

The insulative intervening portions 71 are formed in the bus bar module 2 continuously over an entirety from one end to the other end in the transverse direction. Due to this, the adjacent bus bars 6 can surely be insulated from each other.

A width of the insulative intervening portions 71 intervened between the bus bars 6, that is, a distance between the adjacent bus bars 6 is 8 mm in creeping distance. The adjacent bus bars 6 can surely be insulated from each other, while the battery group can be stored in a compact manner.

A plurality of openings 72 is formed in the insulating laminate portion 7 over the entirety from one end to the other end in the longitudinal direction. The openings 72 can split the stress generated in the insulating laminate portion 7. Due to this, each opening 72 corresponds to a stress splitting portion of the present invention.

The openings 72 form concentric circles with the connection holes 62 of the bus bars 6, and are opened somewhat larger than the connection holes 62. The connection holes 62 of the bus bars 6 and the openings 72 of the insulating laminate portion 7 are opened at the same positions for the respective batteries 1 in an axial direction. The openings 72 are effectively disposed together with the connection holes 62. The four batteries 1 aligned in the transverse direction configure the one set of battery pack 11. The battery group 10 has four sets of battery packs 11 in the transverse direction. The adjacent battery packs 11 are disposed alternately with their positions being offset by a pitch that is half an interval between the batteries 1 of the battery pack 11 that are adjacent in the longitudinal direction. The respective batteries 1 in the one set of battery pack 11 have the same positions in the longitudinal direction as the respective batteries 1 of alternately next set of battery pack 11. Due to this, when the bus bar module 2 is projected in a perpendicular direction (transverse direction C shown in FIG. 4) that intersects perpendicularly with the longitudinal direction of the bus bar module 2, the plurality of openings 72 is present while being overlapped with each other continuously from one end to the other end in the perpendicular direction of the bus bar module 2. In this case, over the entirety from the one end to the other end in the transverse direction of the bus bar module 2, the stress generated somewhere in the longitudinal direction of the bus bar module 2 after the molding is split. The plurality of openings 72 is arranged along the longitudinal direction of the bus bar module 2, with two of them forming a set with the battery pack 11 of the alternately next set. The stress generated in the bus bar module 2 can be split at two portions in the longitudinal direction. Due to this, the deformation of the bus bar module 2 can effectively be prevented. Due to this, the stress generated in the insulating laminate portion 7 after the molding can be dispersed into smaller magnitudes, and the insulating laminate portion 7 can more surely be fixed to the bus bars 6. The openings 72 also function as gas holes for letting the gas generated from the batteries 1 to flow out to a space 80 of the bus bar module 2.

To manufacture the bus bar module 2, for example, the bus bars 6 are disposed in a molding die so as to insert mold the TPC.

The bus bar module 2 on the upper side of the battery group 10 arranges three pieces of bus bars 6 in the longitudinal direction. The separator 4 and the lower bus bars 3 are disposed on the lower side of the battery group 10. The separator 4 is formed of insulating resin. The separator 4 forms a thin plate shape, and includes a housing portion 30 for housing the lower bus bars 3 on a rear surface.

The lower bus bars 3 on the lower side of the battery group 10 are thin plates formed of copper, and have connection holes 32 formed at positions corresponding to the ends 18 of the batteries 1.

The separator 4 is an insulating plate formed of PBT (polybutylene terephthalate). Recessed portions 41 for housing the lower bus bars 3 are formed on the lower surface of the separator 4. Openings 42 that form concentric circles with the connection holes 32 of the lower bus bars 3 are formed at bottom portions of the recessed portions 41. The lower bus bars 3 are disposed at a lower portion of the battery group 10 in a state of being housed in the recessed portions 41 of the separator 4. Then, similar to the bus bars 6 of the upper-side bus bar module, the lower bus bars 3 are electrically connected to the batteries 1 by tabs projecting from inner circumferential surfaces of the connection holes 32 being welded to terminals 18 of the batteries 1 (see FIG. 6).

As shown in FIG. 3, the battery module 9 is housed in the housing portion 82 of the housing 8. The upper part of the battery module 9 is covered by the cover 81. The space 80 for discharging gas is formed between the battery module 9 and the cover 81.

According to the bus bar module 2 of the present first embodiment, the insulating laminate portion 7 formed of the TPC is laminated on the inner surfaces 6a facing the ends 18 of the batteries 1 and the outer surfaces 6b of the bus bars 6.

In general, resin such as the TPC has a large thermal expansion difference compared to metal upon molding the bus bar module, and distortion is generated in the resin. However, the TPC has a relatively low flexural modulus, and a large elongation at yield. Further, the TPC has a large ductility. Due to this, the insulating laminate portion 7 is fixed to the bus bars 6 in the somewhat stretched state, by following the bus bars 6 having a small contraction rate. The insulating laminate portion 7 formed of the TPC warps by following the ends 18 of the respective batteries 1, together with the bus bars 6. Accordingly, the warping of the bus bar module 2 can be prevented.

The longitudinal direction (vertical direction) of the bus bar module 2 is longer than the perpendicular direction (transverse direction) that intersects perpendicularly with the longitudinal direction of the bus bar module 2. Due to this, a deformation amount of the bus bar module 2 in the longitudinal direction is large as compared to a deformation amount of the bus bar module 2 in the transverse direction. Thus, the bus bars 6 are divided into a plurality along the longitudinal direction of the bus bar module 2, and the insulative intervening portions 71 are caused to be intervened between the divided bus bars 6. Due to this, the bus bars 6 become short, and stress caused by a difference in the shrinking amount of the bus bars 6 and the shrinking amount of the insulating laminate portion 7 after the molding becomes small. Due to this, a deformation of the bus bar module 2 such as warping can effectively be prevented. The bus bar module 2 can bend following the ends 18 of the batteries 1, and the warping of the bus bar module 2 can be prevented.

In the insulating laminate of portion 7, the plurality of openings 72 is uniformly interspersed over the entirety from its one end to the other end in the longitudinal direction. A portion where the stress is generated no longer exists over the entirety in the longitudinal direction of the insulating laminate portion 7. Due to this, the deformation of the entirety of the bus bar module 2 such as warping can effectively be prevented.

Accordingly, the interval between the ends 18 of the batteries 1 and the bus bar module 2 can surely be sealed by configuring the bus bar module 2 of the present embodiment so as to have less warping and have the insulating laminate portion 7 surely fixed to the bus bars 6. Further, the interval between an upper surface of the holder 5 and the bus bar module 2 can surely be sealed. Accordingly, when gas is generated by overcharging, over-discharging, internal short-circuiting, external short circuiting or the like of the batteries 1, the gas discharged from the ends 18 of the batteries 1 can be suppressed from leaking out to the outside of the housing 9 from gaps between the ends 18 of the batteries 1 and the bus bar module 2, and the gas can appropriately be introduced to the space 80.

As shown in FIG. 3 to FIG. 5, the insulating laminate portion 7 is formed on an entire periphery of an outer circumference of the bus bar module 2. High gas-leak resistance (sealing performance) can be secured for an entire circumference of an interface of the bus bar module 2 and the cover 81.

With the insulating laminate portion 7 being formed of the TPC, stress applied on the bus bars 6 by elasticity of the insulating laminate portion 7 is small even when the insulating laminate portion 7 is formed over an entire periphery of outer circumferences of the bus bars 6; and deformation of the bus bars 6 and displacement resulting from the deformation as a result thereof can also be suppressed.

The bus bars 6 are integrally formed with the insulating laminate portion 7. The insulating laminate portion 7 can restrain surfaces of the conductive bus bars 6, especially upper surfaces thereof facing the space 80 for the discharged gas from being exposed, and degradation of the bus bars 6 such as oxidization can be suppressed.

The deformation of the bus bars 6 can be suppressed by the insulating laminate portion 7 and the elongated portions 75 changing their shapes when the cover 81 presses the insulating laminate portion 7 and the elongated portions 75 surrounding the bus bar module 2.

Second Embodiment

Figure 7:
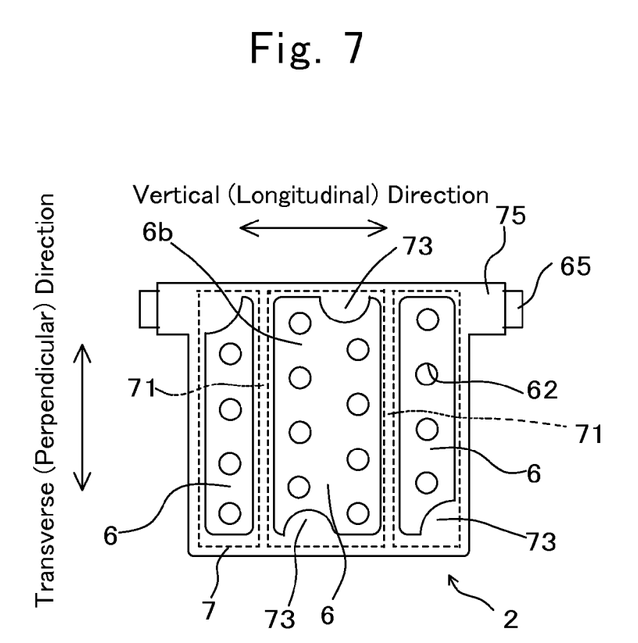
FIG. 7 is a plan diagram of a bus bar module of a second embodiment.
Figure 8:
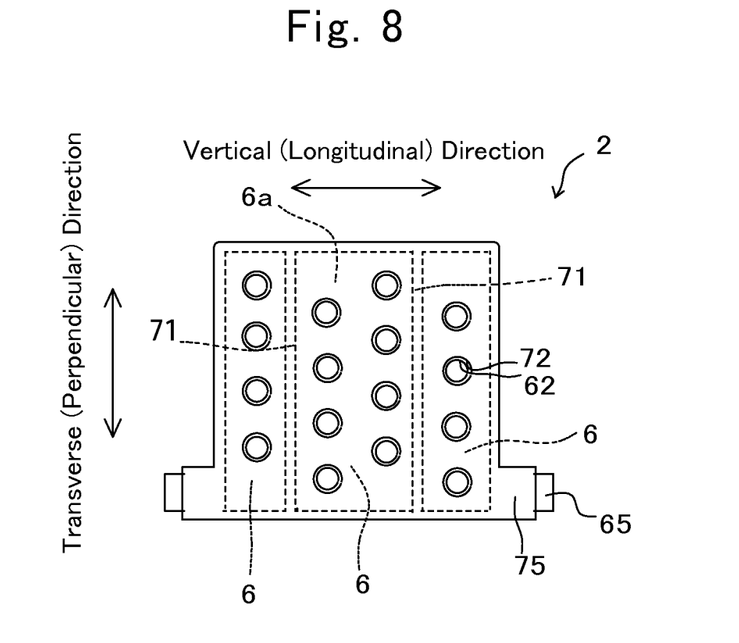
FIG. 8 is a backside diagram of the bus bar module of the second embodiment.

In a bus bar module of the present second embodiment, as shown in FIG. 7 and FIG. 8, an insulating laminate portion 7 hardly covers outer surfaces 6b of bus bars 6, but continuously covers peripheral portions of the outer surfaces 6b from inner surfaces 6a of the bus bars 6, encompassing side surfaces 6c. The peripheral portions of the outer surfaces 6b of the bus bars 6 include wide portions 73 of which width is partially widened.

Figure 9:
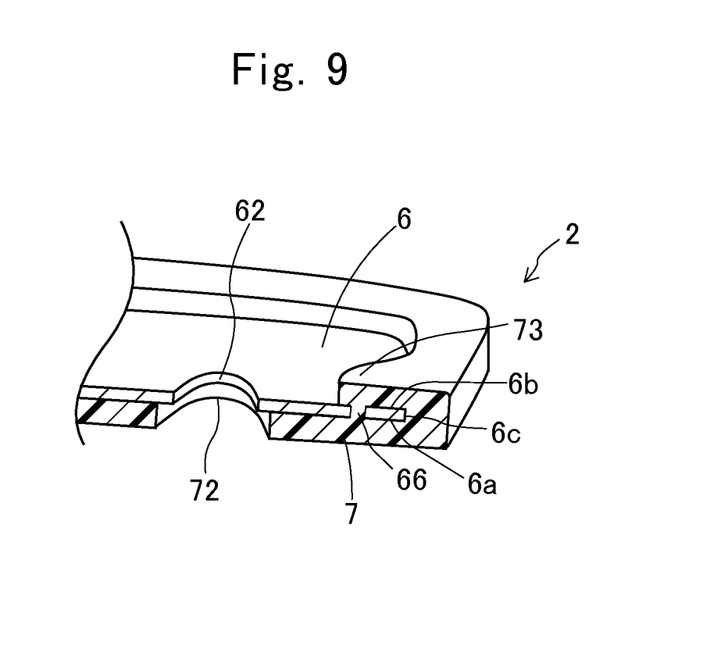
FIG. 9 is a perspective diagram of the bus bar module of the second embodiment.

As shown in FIG. 9, each peripheral portion of the bus bars 6 has a through hole 66 formed therein, and a part of the insulating laminate portion 7 is allowed to intrude from the peripheral portions of the outer surfaces 6b of the through holes 66 toward the inner surfaces 6a. Due to this, the insulating laminate portion 7 becomes much less likely to peel from the bus bars 6 by an anchoring effect of the insulating laminate portion 7 having intruded into the through holes 66.

Third Embodiment

Figure 10:
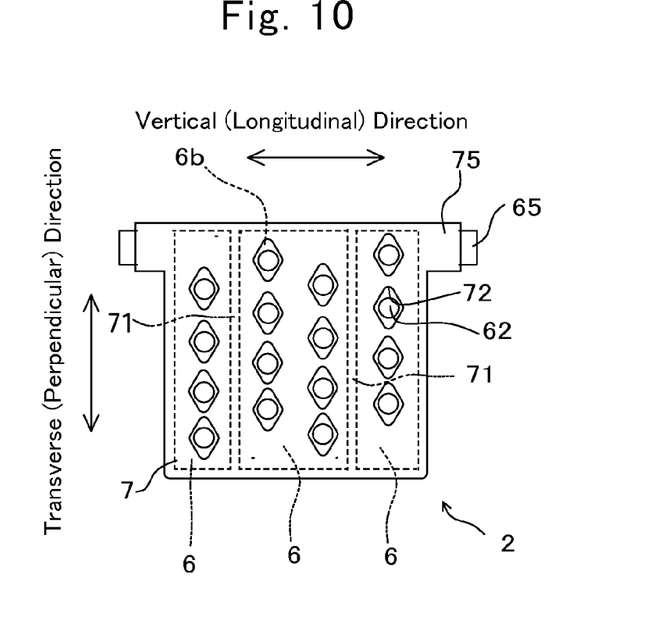
FIG. 10 is a plan diagram of a bus bar module of a third embodiment.
Figure 11:
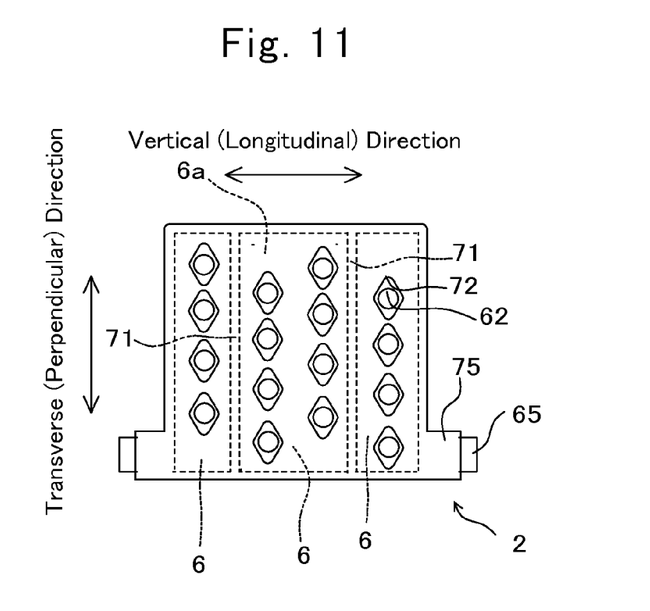
FIG. 11 is a backside diagram of the bus bar module of the third embodiment.

In a bus bar module of the present third embodiment, as shown in FIG. 10 and FIG. 11, openings 72 formed in an insulating laminate portion 7 have a diamond-shape that extends along a transverse direction and is long in the transverse direction. The openings 72 having such a diamond shape are formed in the insulating laminate portion 7 that is laminated on both outer surfaces 6b and inner surfaces 6a of bus bars 6. When a bus bar module 2 is projected from the transverse direction C, a plurality of openings 72 is present continuously from one end to the other end in the transverse direction of the bus bar module 2.

The openings 72 are present at some portions of the bus bar module 2 in a longitudinal direction, over an entirety from its one end to the other end in a transverse direction that is a perpendicular direction relative to the longitudinal direction of the bus bar module 2. Over the entirety from the one end to the other end in the transverse direction of the bus bar module 2, stress generated somewhere in the longitudinal direction of the bus bar module 2 after the molding is split. Deformation of an entirety of the bus bar module 2 can be prevented.

In the above first to third embodiments, four batteries 1 aligned in a line are regarded as being a set and are connected serially by the bus bar module 2 and the lower bus bars 3. However, a plurality of batteries 1 aligned in two rows or three rows may be regarded as being a set and be connected by the bus bar module 2 and the bus bars.

The bus bar module 2 of the above first to third embodiments is provided on the end 18 side of the batteries 1 that is closer to the cover 81. However, it may be provided on the other end 18 side that is far from the cover 81 and closer to a bottom of the housing 8.

As described above, the embodiments of the present invention have been described, but the present invention is not limited to the aforementioned embodiments. It can be implemented in various embodiments, to which a person skilled in the art may make changes, modifications, and the like within a scope that does not go beyond the essence of the present invention.

The invention claimed is:

1. A bus bar module disposed on one end side of each battery in a battery group consisting of batteries, wherein each battery in the battery group has a pair of opposite axial ends at which first and second terminals are respectively located, the bus bar module comprising:
    a bus bar made of a conductive metal and electrically connecting the terminals of the respective batteries in the battery group; and
    an insulating laminate portion that is laminated, at least on an inner surface of the bus bar, among the inner surface facing the ends of the batteries of the battery group and an outer surface on an opposite side of the inner surface of the bus bar, wherein
    the insulating laminate portion has an insulating material that includes thermoplastic elastomer and/or rubber,
    the bus bar is one of a plurality of bus bars that extend in one direction of the bus bar module,
    the insulating laminate portion is provided with a plurality of stress splitting portions, and
    the stress splitting portions of the plurality of stress splitting portions overlap with each other continuously from one end to an opposite end of the bus bar module, when viewed in a direction perpendicular to a longitudinal direction of the bus bars of the plurality of bus bars and perpendicular to axes of the batteries of the battery group.

2. The bus bar module according to claim 1, wherein an insulative intervening portion is located between adjacent pairs of the bus bars.

3. The bus bar module according to claim 1, wherein the stress splitting portions of the plurality of stress splitting portions are uniformly interspersed in the insulating laminate portion.

4. The bus bar module according to claim 1, wherein
    the bus bar includes connection holes for connecting with the first terminals of the batteries of the battery group, and
    each of the stress splitting portions is an opening, and wherein locations of the openings of the stress splitting portions in a planar direction matches those of the connection holes.

5. The bus bar module according to claim 1, wherein the plurality of stress splitting portions is arranged along a longitudinal direction of the bus bar module.

6. The bus bar module according to claim 1, wherein the insulating laminate portion covers from the inner surface to the peripheral portion of the outer surface of the bus bar, encompassing a side surface of the bus bar.

7. The bus bar module according to claim 1, wherein the bus bar includes a projecting portion, and a whole circumference of the projecting portion is covered by an elongated portion elongated from the insulating laminate portion.

8. The bus bar module according to claim 1, wherein a flexural modulus of the thermoplastic elastomer and/or rubber is 20 to 1300 MPa.

9. The bus bar module according to claim 1, wherein an elongation at yield of the thermoplastic elastomer and/or rubber is 15% or more.

* * * * *